(12) United States Patent
Markel

(10) Patent No.: US 8,067,893 B2
(45) Date of Patent: Nov. 29, 2011

(54) INTELLIGENT LIGHT FIXTURE FACILITATING UNIVERSAL LIGHT BULB

(76) Inventor: Stacy Markel, Ann Arbor, MI (US)

( * ) Notice: Subject to any disclaimer, the term of this patent is extended or adjusted under 35 U.S.C. 154(b) by 414 days.

(21) Appl. No.: 12/259,538

(22) Filed: Oct. 28, 2008

(65) Prior Publication Data
US 2010/0102751 A1 Apr. 29, 2010

(51) Int. Cl.
*H01K 1/62* (2006.01)
*H01J 7/44* (2006.01)
(52) U.S. Cl. ............... 315/51; 315/293; 315/246
(58) Field of Classification Search ........... 315/46, 315/51–54, 272, 295, 299
See application file for complete search history.

(56) References Cited

U.S. PATENT DOCUMENTS

| | | | |
|---|---|---|---|
| 1,172,953 A | 2/1916 | Dempster | |
| 1,640,434 A | 8/1927 | Weston | |
| 3,028,525 A * | 4/1962 | Morton | 315/272 |
| 3,215,891 A * | 11/1965 | Fritz et al. | 315/50 |
| 3,331,013 A | 7/1967 | Cunningham | |
| 3,517,259 A | 6/1970 | Dotto | |
| 3,781,593 A * | 12/1973 | Rodriguez | 315/58 |
| 3,836,814 A | 9/1974 | Rodriquez | |
| 4,438,344 A | 3/1984 | Albert et al. | |
| 5,731,663 A | 3/1998 | Davis | |
| 5,989,070 A | 11/1999 | Al-Turki et al. | |
| 6,113,433 A | 9/2000 | Al-Turki et al. | |
| 6,162,100 A | 12/2000 | Al-Turki et al. | |
| 7,090,390 B2 | 8/2006 | Pazula | |

* cited by examiner

*Primary Examiner* — Daniel D Chang
(74) *Attorney, Agent, or Firm* — Gifford, Krass, Sprinkle, Anderson & Citkowski, P.C.

(57) ABSTRACT

An intelligent light fixture facilitates the use of a 'universal' light bulb having a wattage rating. A lamp dimmer circuit disposed within the fixture is in electrical communication between the AC line and a socket. A bulb test circuit within the fixture is operative to determine the maximum wattage of the bulb. A controller, also within the fixture includes a wattage select input. The controller is operative to determine the maximum wattage of the bulb using the bulb test circuit, compare the maximum wattage to the wattage select input and, if the maximum wattage is greater than the wattage select input, control the dimmer circuit to ensure that the power delivered to the bulb does not exceed the wattage select input. The bulb test circuit may determine the maximum wattage of the bulb by measuring the resistance of the bulb's filament or alternatively, by temporarily impressing line voltage across the bulb and measuring the current drawn by the bulb's filament. Alternative embodiments provide a wattage dial disposed on an adapter unit or directly on the threaded base of a bulb.

4 Claims, 2 Drawing Sheets

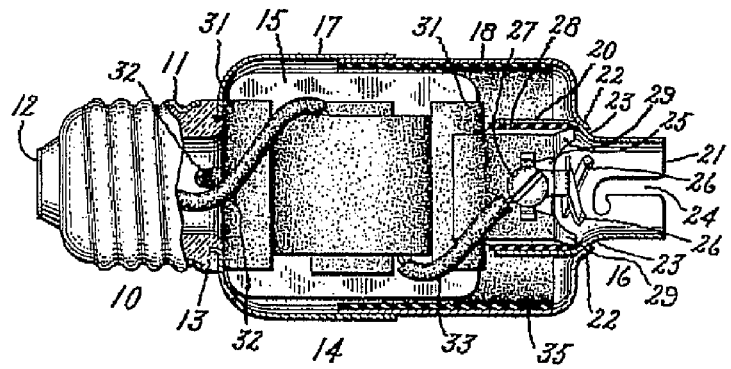
Fig - 1
(PRIOR ART)
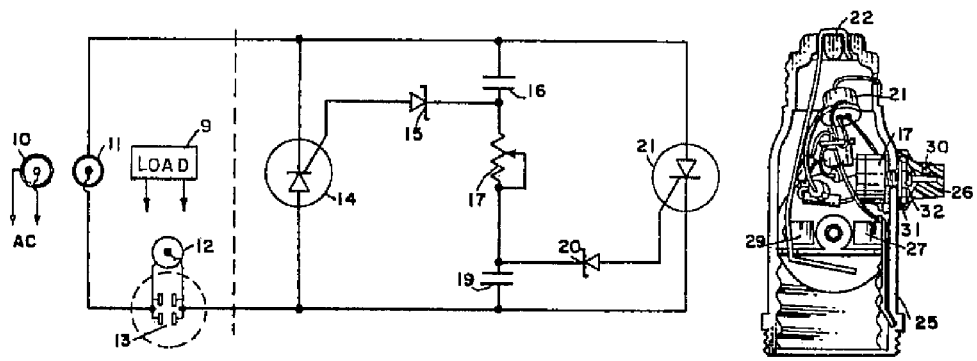
Fig - 2
(PRIOR ART)
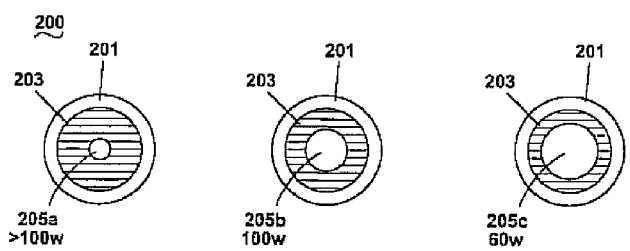
Fig – 3
(PRIOR ART)
Fig – 4
(PRIOR ART)
Fig – 5
(PRIOR ART)

INTELLIGENT LIGHT FIXTURE FACILITATING UNIVERSAL LIGHT BULB

FIELD OF THE INVENTION

This invention relates generally to residential lighting and, in particular, to an intelligent light fixture facilitating the use of a 'universal' light bulb.

BACKGROUND OF THE INVENTION

As different types of residential lighting have evolved so, too, have different types of light bulbs. Apart from major differences such as incandescent versus fluorescent, different base styles have been introduced including, Edison, candelabra and prong-type connectors for halogen. See, for example, www.donsbulbs.com. In addition to these differences, power ratings vary substantially from a few watts to hundreds of watts.

The plethora of different bulb types makes shopping for bulbs problematic, in that one must make an inventory of each type and style required, while keeping track of the maximum usable power for a particular fixture.

Various adapters have been proposed to allow a lamp socket to accommodate more than one type of bulb. Some of these inventions date back more than a hundred years. As one example, U.S. Pat. No. 1,172,953, is directed to "adapters for enabling an electric lamp or the like to be operated at its rated or any desired voltage in a socket or receptacle between whose terminals some different voltage prevails." As shown in FIG. 1, the patent discloses a unitary structure having a base 10 for a screw-in socket, a receptacle 16 for a lamp having a bayonet-type base, and means such as a transformer for producing the desired voltage between the terminals or contacts of the receptacle.

As electrical solutions have given way to electronic implementations, transformers have been replaced in some cases with solid-state dimmers. An early version, disclosed in U.S. Pat. No. 3,517,259 (FIG. 2), describes a lamp socket containing electrical circuitry for variably brightening and dimming the electrical circuit current supplied to a lamp within the socket. The electronic circuitry is comprised of oppositely poled silicon-controlled rectifiers (SCRs) connected to Zener diodes and a phasing circuit having a plurality of capacitors and variable resistance in series across the SCRs. An object of the invention is to provide means of controlling the light intensity of incandescent lamps "without the use of bulky rheostats which dissipate power that is expensive and heat which creates a problem to remove."

In addition to being in convenient, use of the wrong bulb in a given socket may be dangerous. Many fixtures specify that only bulbs up to a particular wattage may be used, and that higher-wattage bulbs may result in a fire hazard. U.S. Pat. No. 7,234,973 solves this problem mechanically. FIG. 3 illustrates a modified light bulb base according to this patent where the contact at the bottom of the bulb base is specifically sized to be small, typically 3 millimeters (mm) in diameter. FIG. 4 illustrates a modified light bulb base where the contact at the bottom of the bulb base is 8 mm in diameter. FIG. 5 illustrates a modified light bulb base where the contact at the bottom of the bulb base is 13 mm in diameter.

Each bulb base 200 includes the standard sized threaded base 201, an insulative material 203 and a center contact 205a, 205b, or 205c specifically sized so as to operate with a specific type of luminare socket. As seen in FIGS. 3-5, the size of the contact 205a, 205b, or 205c will vary with the wattage of the bulb. Thus, a light bulb greater than 100 watts will feature a small contact 205c which has a diameter typically 3 mm in size. A bulb between 61 watts and 100 watts will use a slightly larger contact 205b with a diameter that is approximately 8 mm in size while a bulb 60 watts or less will use the largest contact 205a that is approximately 13 mm in diameter.

While the '973 patent addresses the compatibility issue, as admitted in the disclosure, "the invention involves modifying both the light bulb base as well as the luminare socket used with the base." Given the vast, installed infrastructure, particularly of Edison-style bulbs, the wholesale modification of bulbs and sockets would take considerable time, if successful. Accordingly, the need remains for universality without bulb modification, if possible.

SUMMARY OF THE INVENTION

This invention relates generally to residential lighting and, in particular, to an intelligent light fixture facilitating the use of a 'universal' light bulb. The fixture is configured for use with a light bulb having a wattage rating. The fixture comprises an input to receive AC line voltage and a socket into which a bulb is inserted. A lamp dimmer circuit disposed within the fixture is in electrical communication between the AC line and the socket. A bulb test circuit within the fixture is operative to determine the maximum wattage of the bulb. A controller, also within the fixture includes a wattage select input. The controller is operative to determine the maximum wattage of the bulb using the bulb test circuit, compare the maximum wattage to the wattage select input and, if the maximum wattage is greater than the wattage select input, control the dimmer circuit to ensure that the power delivered to the bulb does not exceed the wattage select input.

The bulb test circuit may determine the maximum wattage of the bulb by measuring the resistance of the bulb's filament or alternatively, by temporarily impressing line voltage across the bulb and measuring the current drawn by the bulb's filament. An alarm may be included to inform a user that a bulb has not been inserted in the socket or that the socket contains a burned-out bulb.

An alternative embodiment of the invention comprises an adapter housing including a threaded base and a socket into which a bulb is inserted, a lamp dimmer circuit within the housing in electrical communication between the AC line and the socket, and a wattage dial disposed on the housing, the dial including a limited number of watt-specific settings. The watt-specific settings include one or more of the following: 25 watts; 40 watts; 60 watts; 75 watts; and 100 watts. The threaded base may form a portion of the outer surface of the housing, and the socket may be of a different size than the threaded base. Fore example, the threaded base may be an Edison-type base formed on the outer surface of the housing, and the socket is sized to accept candelabra bulbs.

A wattage-adjustable light bulb according to the invention comprises a light-transmissive globe including a filament coupled to a threaded base; a lamp dimmer circuit within the threaded base housing in electrical communication between the base and the filament; and a wattage dial disposed on the base, the dial including a limited number of watt-specific settings. Again, the watt-specific settings include one or more of the following: 25 watts; 40 watts; 60 watts; 75 watts; and 100 watts.

BRIEF DESCRIPTION OF THE DRAWINGS

FIG. 1 is a drawing of a prior-art adapter unit utilizing a transformer to alter voltage;

FIG. 2 is a drawing of a prior-art adapter unit utilizing a solid state dimmer circuit;

FIG. 3 illustrates a modified light bulb base according to U.S. Pat. No. 7,234,973 where the contact at the bottom of the bulb base is specifically sized to be small, typically 3 millimeters (mm) in diameter;

FIG. 4 illustrates a modified light bulb base according to U.S. Pat. No. 7,234,973 where the contact at the bottom of the bulb base is 8 mm in diameter;

FIG. 5 illustrates a modified light bulb base according to U.S. Pat. No. 7,234,973 where the contact at the bottom of the bulb base is 13 mm in diameter;

DETAILED DESCRIPTION OF THE INVENTION

Figure 6:
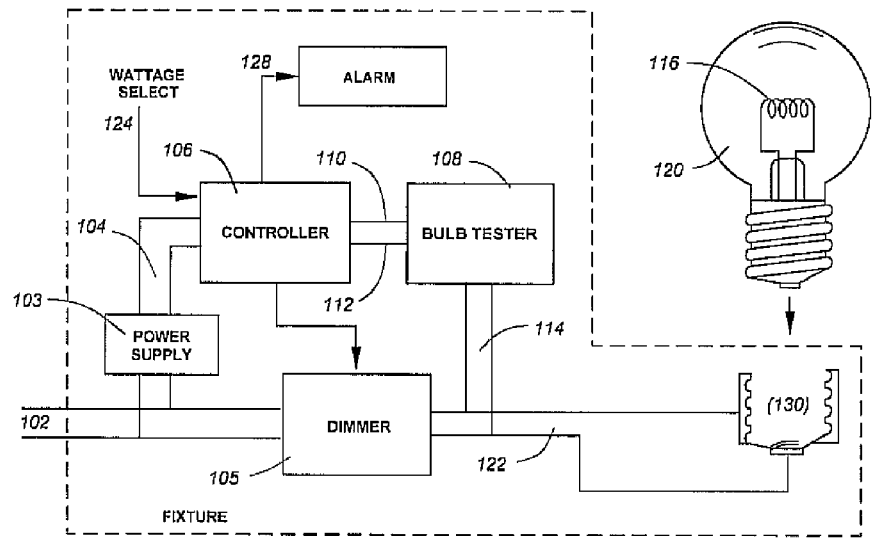
FIG. 6 depicts an intelligent light fixture according to a preferred embodiment of the invention.

Having discussed certain prior-art devices, the reader's attention is directed to FIG. 6, which depicts an intelligent light fixture according to a preferred embodiment of the invention. All of the components shown, with the exception of bulb 120, are contained in the fixture, which is depicted in broken-line form.

In FIG. 6, the incoming AC line is shown at 102. The line feeds a dimmer circuit 105, described in her detail below, and a power supply 103. The supply 103 is used to activate controller 106, preferably an inexpensive unit such as the PIC10F200 series available from Microchip Technology Inc. of Chandler, Ariz. Power supply 103 is easily implemented with a full- or half-wave rectifier, filter capacitor and Zener diode or 3-terminal regulator. More sophisticated supplies may be constructed with integrated circuits of the type made by Power Integrations of San Jose, Calif., and others. Alternatively a battery may be used as the low drain should allow extended operation without replacement.

The desired wattage for the fixture is input to the controller 106 either through one or more input lines 124, or it may be entered in nonvolatile memory, via microswitches, by cutting printed circuit board (PCB) clad, etc. A control may be provided whereby a user may adjust the wattage select to be less than the rated amount, but not more than that. For example, if the fixture specifies a 75-w bulb or less, a user may set a control to specify 40 watts, for example.

When power is delivered through line 102, controller 106 powers up, and a signal is delivered to a bulb test circuit 108 through line 110. The bulb tester circuit, which may be integrated into controller 106, performs a test on bulb 120 to determine its wattage. In the preferred embodiment, this is accomplished by measuring the resistance of filament 115. Using a voltage of 115 to 120 volts, the wattage of the bulb may be determined by $P=V^2/R$. Alternatively, a voltage of 115 to 120 volts may temporarily impressed across the bulb 120, using dimmer circuit 105, for example, with bulb tester circuit 108 being used instead to measure the current drawn by the bulb.

Once the wattage of the bulb is automatically determined by the intelligent fixture, the controller operates dimmer 105 to ensure that the bulb only consumes the power specified by the selected wattage. A suitable dimmer circuit 105 would be well known to the skilled artisan. Even the circuit shown in FIG. 2 is applicable, though the SCRs would be replaced with a TRIAC and Zener diode would be implemented with a DIAC according to more modern component availability. The potentiometer used for control may be replaced with a field-effect transistor (FET), allowing for voltage-controlled operation by controller 106. As an option, an audio or visual alarm 128 may be provided which may be activated by the controller in the event that no bulb has been installed or if the bulb is burned out, both of which would test as an open circuit when interrogated by test circuit 108.

Figure 7:
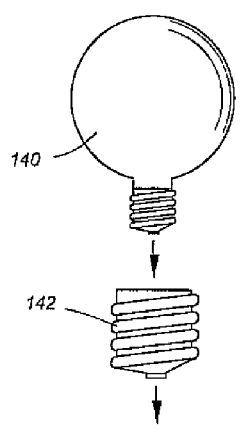
FIG. 7 shows how a candelabra-to-Edison base converter can result in a 'universal' light bulb applicable to numerous situations.

The intelligent fixture just described opens up the possibility of a 'universal' light bulb in the sense that a bulb manufacturer could sell a single, high-wattage bulb, knowing that it will work in any of the fixtures at the proper power level. The fixture is applicable to any kind of incandescent bulb, possible including light-emitting diode replacements currently in development. To accommodate different base styles, an adapter may be used to accept a candelabra base into an Edison base, as shown in FIG. 7. Halogen to Edison adapters may also be devised, with the intelligent fixture automatically adjusting for the desired power level.

Figure 8:
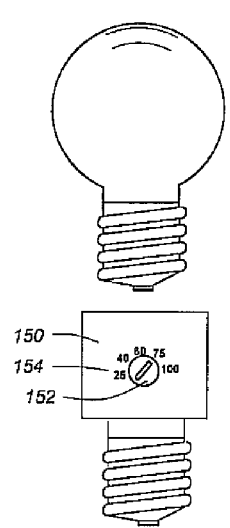
FIG. 8 illustrates an alternative embodiment of the invention wherein a dimmer adapter has click stops at specific wattage ratings.

FIG. 8 illustrates an alternative embodiment of the invention for use with existing, non-intelligent fixtures. This embodiment includes a dimmer adapter 150 with a dial 152 turn with a small screwdriver at click stops 154 representative of specific wattage ratings. Such an adapter my be adjusted by a consumer once the proper power rating for a particular fixture or, more preferably, the adapter would be set by the manufacturer and cemented in position to prevent tampering. The adapter may then be screwed into a fixture to ensure that the specified wattage rating will not be exceeded even if a larger bulb is used. Again, a typical TRIAC-DIAC type of dimmer circuit would preferably be implemented.

Figure 9:
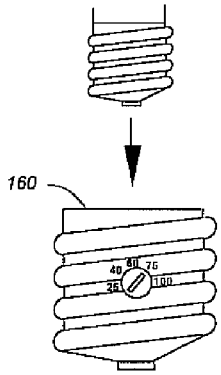
FIG. 9 illustrates a further alternative embodiment of the invention wherein the dimmer adapter is disposed in a candelabra-to-Edison base converter.
Figure 10:
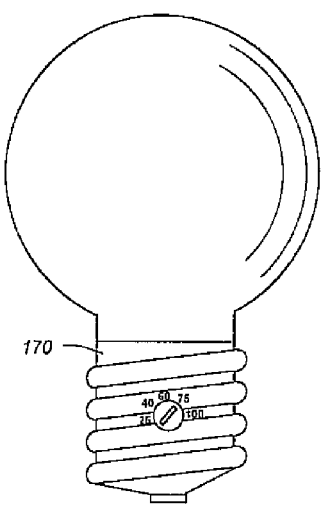
FIG. 10 is a drawing of yet a different alternative embodiment of the invention wherein the dimmer adapter is disposed in the base of a light bulb.

FIG. 9 illustrates a further alternative embodiment of the invention wherein the dimmer adapter 160 is disposed in a candelabra-to-Edison base converter, and FIG. 10 is a drawing of yet a different alternative embodiment of the invention wherein the dimmer adapter 170 is disposed in the base of a light bulb directly. As opposed to the screwdriver-operated dial a proprietary shape (i.e., 3-sided) tool may be required to further discourage tampering.

I claim:

1. An intelligent light fixture for use with a light bulb having a wattage rating, the fixture comprising:
   an input to receive AC line voltage;
   a socket into which a bulb is inserted;
   a lamp dimmer circuit in electrical communication between the AC line and the socket;
   a bulb test circuit in electrical communication with the socket, the bulb test circuit being operative to determine the maximum wattage of the bulb; and
   a controller operated off of the AC line, the controller having a wattage select input, and wherein the controller is operative to perform the following functions:
   a) determine the maximum wattage of the bulb using the bulb test circuit,
   b) compare the maximum wattage to the wattage select input and, if the maximum wattage is greater than the wattage select input,
   c) control the dimmer circuit to ensure that the power delivered to the bulb does not exceed the wattage select input.

2. The intelligent light fixture of claim 1, wherein the bulb test circuit determines the maximum wattage of the bulb by measuring the resistance of the bulb's filament.

3. The intelligent light fixture of claim 1, wherein the bulb test circuit determines the maximum wattage of the bulb by temporarily impressing line voltage across the bulb and measuring the current drawn by the bulb's filament.

4. The intelligent light fixture of claim 1, further including an alarm to inform a user that a bulb has not been inserted in the socket or that the socket contains a burned-out bulb.

\* \* \* \* \*